(12) United States Patent
Peterson et al.

(10) Patent No.: US 9,873,514 B2
(45) Date of Patent: Jan. 23, 2018

(54) HYBRID PASSIVE/ACTIVE PRESSURE PREVENTION SYSTEM

(71) Applicant: The Boeing Company, Chicago, IL (US)

(72) Inventors: Wayne H. Peterson, Bothell, WA (US); Michael E. McDonald, Arlington, WA (US); Michael A. Fleming, Bellevue, WA (US); Sun Gil Kim, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 14/840,961

(22) Filed: Aug. 31, 2015

(65) Prior Publication Data

US 2017/0057640 A1    Mar. 2, 2017

(51) Int. Cl.
*B64D 13/04*    (2006.01)
*B64C 1/14*    (2006.01)

(52) U.S. Cl.
CPC ............ *B64D 13/04* (2013.01); *B64C 1/1407* (2013.01)

(58) Field of Classification Search
CPC ........ B64D 13/02; B64D 13/04; B64C 1/1407
USPC .......................................................... 701/3
See application file for complete search history.

(56) References Cited

U.S. PATENT DOCUMENTS

| | | | |
|---|---|---|---|
| 3,053,162 A | 9/1962 | Andresen, Jr. | |
| 4,553,474 A * | 11/1985 | Wong | B64D 13/04 454/71 |
| 5,337,977 A * | 8/1994 | Fleming | B64C 1/143 244/129.5 |
| 5,480,109 A * | 1/1996 | Klein | B64C 1/1407 244/129.5 |
| 2009/0305622 A1* | 12/2009 | Schiek | B64D 13/04 454/74 |
| 2010/0203818 A1 | 8/2010 | Gray et al. | |
| 2011/0017868 A1 | 1/2011 | Arthurs et al. | |

FOREIGN PATENT DOCUMENTS

| | | |
|---|---|---|
| EP | 1894838 | 3/2008 |
| EP | 2703282 | 3/2014 |

OTHER PUBLICATIONS

Extended European Search Report for EP Application No. 16168591.2 dated Nov. 23, 2016.

* cited by examiner

*Primary Examiner* — Redhwan K Mawari
*Assistant Examiner* — Anshul Sood
(74) *Attorney, Agent, or Firm* — Kunzler, PC

(57) ABSTRACT

Disclosed herein is a hybrid mechanical/reactive pressure prevention system that includes a passive pressure control device operably coupled to a door that allows air within a pressurized vehicle to flow out of the pressurized vehicle. An event module detects a door event in the pressurized vehicle. The door event indicates that a door is not secure and air within the pressurized vehicle is being released through the passive pressure control device. An altitude module determines an altitude of the pressurized vehicle in response to detecting the door event. An electronic pressure control device one or more of reduces air inflow into the pressurized vehicle and increases air outflow out of an active pressure control device of the pressurized vehicle in response to the altitude of the pressurized vehicle being below a cutoff altitude.

20 Claims, 5 Drawing Sheets

HYBRID PASSIVE/ACTIVE PRESSURE PREVENTION SYSTEM

FIELD

This disclosure relates generally to pressurized vehicles, and more particularly to preventing over-pressurization and/or under-pressurization within a pressurized vehicle.

BACKGROUND

Vehicles that are capable of being pressurized, such as airplanes, may include a pressure prevention system to prevent dangerous over-pressurization situations within the vehicle. Conventional pressure prevention systems include only a mechanical outlet that allows air to flow out of the vehicle in the event of a pressurization situation. However, mechanical venting systems have a finite capability to vent additional air flowing into the vehicle and still comply with certain pressure prevention requirements. If the capability of the mechanical venting system is exceeded, then the pressure within the vehicle may exceed acceptable levels and fail to comply with pressure prevention requirements. Other conventional pressure prevention systems control pressurization within the vehicle using only computer-controlled means, which introduces shortcomings associated with erroneous sensor readings.

SUMMARY

The subject matter of the present application provides embodiments of methods and apparatuses for pressure prevention within a pressurized vehicle, and associated methods and apparatuses for pressure prevention using a hybrid mechanical/reactive system. The subject matter of the present application has been developed in response to the present state of the art, and in particular, in response to shortcomings of conventional methods and apparatuses for pressure prevention within a pressurized vehicle, such as an airplane or other aircraft.

According to one embodiment, a method includes detecting a door event in a pressurized vehicle. The door event may indicate that a door is not secure and air within the pressurized vehicle is being released through a passive pressure control device operably coupled to the door. In certain embodiments, the method includes determining an altitude of the pressurized vehicle in response to detecting the door event. In yet another embodiment, the method includes one or more of reducing air inflow into the pressurized vehicle and increasing air outflow out of an active pressure control device of the pressurized vehicle in response to the altitude of the pressurized vehicle being below a cutoff altitude.

In one implementation, the method includes one of maintaining a rate of air inflow into the pressurized vehicle and increasing the rate of air inflow into the pressurized vehicle in response to detecting a pressurization event and determining the altitude of the pressurized vehicle is above the cutoff altitude.

In a further embodiment, the passive pressure control device includes a mechanical vent that is operably coupled to a door of the pressurized vehicle such that the vent is opened to allow air within the pressurized vehicle to flow out of the pressurized vehicle in response to the door being unsecured and closed to prevent air outflow out of the pressurized vehicle in response to the door being secured.

In another implementation, one or more of air inflow into the pressurized vehicle is reduced and air outflow out of the pressurized vehicle is increased until a pressure level within the pressurized vehicle meets a threshold pressure level. In certain embodiments, the threshold pressure level is determined as a function of the pressure level within the pressurized vehicle and a pressure level outside the pressurized vehicle.

In some implementations, the method includes activating an alarm in response to one or more of the reduction in air inflow into the pressurized vehicle and the increase in air outflow out of the pressurized vehicle causing a pressure within the pressurized vehicle to be below a safe pressure level. In another embodiment, the alarm remains activated until the pressure level within the pressurized vehicle is at a safe pressure level.

In some embodiments, the cutoff altitude is determined as a function of one or more of a size of one or more air vents of the pressurized vehicle, a rate of air inflow into the pressurized vehicle, a rate of air outflow out of the pressurized vehicle, a volume of a cabin of the pressurized vehicle, a rate at which the pressurized vehicle is ascending, and the structural capability of the vehicle.

In certain embodiments, detecting the door event comprises determining a door is one or more of open, unlatched, and unlocked. In some implementations, the method further includes detecting a pressurization event. Detecting the pressurization event may include determining one or more of a pressurization level within the pressurized vehicle is below a threshold pressurization level and a rate of pressurization within the pressurized vehicle is below a threshold pressurization rate. In one embodiment, the method includes ignoring a door event in response to the pressurized vehicle reaching the cutoff altitude.

In one embodiment, an apparatus includes a passive pressure control device operably coupled to a door that allows air within a pressurized vehicle to flow out of the pressurized vehicle. In a further implementation, the apparatus includes an event module detects a door event in the pressurized vehicle. The door event indicates that a door is not secure and air within the pressurized vehicle is being released through the passive pressure control device. The apparatus, in another embodiment, includes an altitude module which determines an altitude of the pressurized vehicle in response to detecting the door event. In yet another embodiment, the apparatus includes an electronic pressure control device one or more of reduces air inflow into the pressurized vehicle and increases air outflow out of an active pressure control device of the pressurized vehicle in response to the altitude of the pressurized vehicle being below a cutoff altitude.

In one embodiment, the electronic pressure control device one of maintains a rate of air inflow into the pressurized vehicle and increases the rate of air inflow into the pressurized vehicle in response to the event module detecting a pressurization event and the altitude module determining the altitude of the pressurized vehicle is above the cutoff altitude.

In a further embodiment, the passive pressure control device comprises a mechanical vent that is operably coupled to a door of the pressurized vehicle such that the vent is opened to allow air within the pressurized vehicle to flow out of the pressurized vehicle in response to the door being unsecured and closed to prevent air outflow out of the pressurized vehicle in response to the door being secured.

In some embodiments, the electronic pressure control device one or more of reduces air inflow into the pressurized vehicle and increases air outflow out of the pressurized vehicle until a pressure level within the pressurized vehicle meets a threshold pressure level. In another embodiment, the threshold pressure level is determined as a function of the pressure level within the pressurized vehicle and a pressure level outside the pressurized vehicle.

In various embodiments, the apparatus includes an alarm module that activates an alarm in response to one or more of the reduction in air inflow into the pressurized vehicle and the increase in air outflow out of the pressurized vehicle causing a pressure within the pressurized vehicle to be below a safe pressure level. In some embodiments, the alarm remains activated until the pressure level within the pressurized vehicle is at a safe pressure level.

A vehicle, in one embodiment, includes at least one passive vent operably coupled to a door of the vehicle. The vent may open to allow air within the vehicle to flow out of the vehicle in response to the door being unsecured and close to prevent air outflow out of the vehicle in response to the door being secured.

The vehicle, in another embodiment, includes a pressure control system that pressurizes the vehicle. In one embodiment, the pressure control system detects a door event in the vehicle. In a further embodiment, the pressure control system determines an altitude of the vehicle in response to detecting the door event. In a further embodiment, the pressure control system one or more of reduces air inflow into the vehicle and increases air outflow out of an active pressure control device of the vehicle in response to the altitude of the vehicle being below a cutoff altitude. At least a portion of the outflowing air may exit through at least one vent.

In certain embodiments, the pressure control system is further configured to one of maintain a rate of air inflow into the vehicle and increase a rate of air inflow into the vehicle in response to detecting a pressurization event and determining the altitude of the vehicle is above the cutoff altitude.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
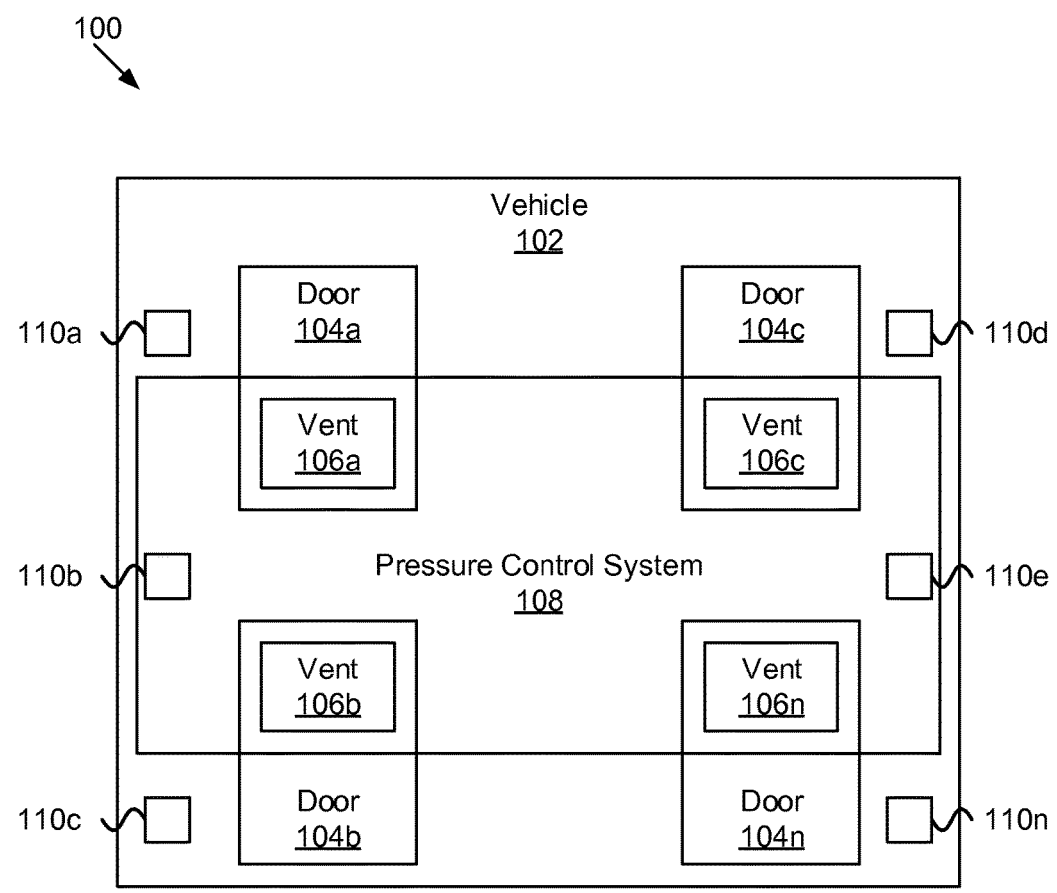
FIG. 1 is a schematic block diagram of a system for a hybrid mechanical/reactive pressure prevention system.

Referring to FIG. 1, and according to one embodiment, a hybrid mechanical/reactive pressure prevention system 100 is shown. The system 100 includes a vehicle 102 that includes one or more doors 104a-n and a pressure control system 108. Each of the one or more doors 104a-n includes one or more vents 106a-n, or similar structures. Furthermore, the vehicle 102 includes one or more air outlets 110.

The vehicle 102 is configured to be pressurized by an inflow of air and/or control of outflow of air through one or more outlet vents 110a-n. In one embodiment, under normal operating conditions, the pressurization within the vehicle 102 is managed by the pressure control system 108. As used herein, pressurization refers to the process of pumping air into the cabin of the vehicle 102 (e.g., the section of the vehicle 102 occupied by passengers, cargo areas, the flight deck/cockpit, and the like) to create a safe and comfortable environment for passengers and crew travelling at high altitudes. Thus, in some embodiments, the vehicle 102 comprises an aircraft, such as an airplane, a spacecraft, or the like. Generally, the vehicle 102 is pressurized to protect passengers, crew members, or other travelers within the vehicle 102 from a number of physiological problems caused by low air pressure above certain altitudes. For example, an airplane may be pressurized to a specific cabin altitude, which may be the equivalent altitude above mean sea level that has the same atmospheric pressure.

The vehicle 102 includes one or more doors 104a-n, or similar structures (such as windows), that prevent and allow access to an entrance or other opening in the vehicle 102. In certain embodiments, the doors 104*a-n* are manually controlled by a user, electrically controlled, hydraulically controlled, and/or the like. Accordingly, the doors 104*a-n* may include a mechanism for opening and closing the doors 104*a-n*, including securely locking the doors 104*a-n*. For example, an airplane door 104*a-n* may include a lever that, when actuated after the door 104*a-n* is closed, latches and locks the door 104*a-n* in a securely closed position. In this manner, when the airplane door 104*a-n* is securely closed, latched, and locked, the airplane cabin can be properly pressurized.

One or more of the doors 104*a-n* include one or more vents 106*a-n*, or similar structures, that provide an outlet for air within the vehicle 102. For example, an airplane may include vents 106*a-n* that allow the airplane to release air from the airplane cabin and bleed-off air pressure within the airplane. In various embodiments, the vents 106*a-n* are mechanically coupled to the doors 104*a-n* such that the opening and closing of a vent 106*a-n* corresponds with the opening, closing and securing of the door 104*a-n*. For example, when the lever of an airplane door 104*a-n* is properly actuated to close, latch, and lock the door 104*a-n*, the respective vent 106*a-n*, which is mechanically coupled to the door 104*a-n*, also is closed. On the other hand, when the lever of the airplane door 104*a-n* is actuated to open the door 104*a-n*, the respective vent 106*a-n* also is opened. Accordingly, a vent 106*a-n* of a door 104*a-n* is considered a passive pressure control device.

In addition to the vents 106*a-n* operably coupled to the doors 104*a-n*, the vehicle 102 includes one or more air outlets 110*a-n* that can be opened and closed to allow or prevent air to flow out of the vehicle 102. The air outlets 110, in one embodiment, are controlled electronically by the pressure control system 108, e.g., the pressure control system 108 may open one or more air outlets 110*a-n* to release air from within the vehicle 102 and decrease the pressure of the vehicle 102. In another embodiment, the air outlets 110*a-n* are manually controlled such that a person can physically open and close an air outlet 110*a-n*. In certain embodiments, the air outlets 110*a-n* can be electrically or otherwise controlled such that personnel, such as, for example, a member of the flight crew or the like, can open and close the air outlets 110*a-n*. Accordingly, an air outlet 110*a-n* that is controlled by the pressure control system 108 is considered an active pressure control device.

In some embodiments, when a door 104*a-n* is not properly secured, meaning the door 104*a-n* is not properly closed, latched, and locked, the vent 106*a-n* mechanically coupled to the door 104*a-n* will also not be closed (e.g., will be at least partially open), which causes air within the vehicle 102 to be released through the vent 106*a-n*. As air is released through the vent 106*a-n*, pressure within the vehicle 102 is decreased and/or the pressurization rate within the vehicle becomes abnormal, e.g., the vehicle 102 may pressurize slower than if the door 104*a-n* was properly closed, latched, and locked, and the vent 106*a-n* was closed. On the other hand, by keeping the vent 106*a-n* open when the door 104*a-n* is not closed, latched, and locked, over-pressurization within the vehicle 102 can be prevented because air within the vehicle 102 can flow out of the vent 106*a-n*. Otherwise, if air within the vehicle 102 was not allowed to flow out of the vehicle 102, the pressure in the vehicle 102 may exceed a pressure at which if a door 104*a-n* that is not closed, latched, and locked were to open, it could result in an intense decompression of the vehicle 102 and cause further damage to the vehicle 102.

The vehicle 102 includes a pressure prevention system to prevent dangerous situations caused by over-pressurization within a vehicle 102 and to comply with various rules, requirements, laws, standards, etc. In some embodiments, manufacturers equip vehicles 102 with pressure prevention systems to comply with one or more regulations, such as governmental regulations for airplanes (e.g., fuselage door pressure prevention regulations 14 C.F.R. §25.831 and 14 C.F.R. §25.783), spacecraft, or the like.

In one embodiment, the pressure control system 108 is configured to maintain, manage, detect, sense, monitor, or the like, the pressurization of the vehicle 102. The pressure control system 108 includes an electronic pressure control system 204, described below with reference to FIG. 2, which manages air inflow into the vehicle 102 and air outflow out of the vehicle 102. The pressure control system 108 can be part of and/or operably coupled to an environmental control system ("ECS") for the vehicle 102. For example, the pressure control system 108 may be one component of an ECS for an airplane, which, in addition to using the pressure control system 108 to control the cabin pressure within the airplane, may also provide thermal control, smoke detection, fire suppression, or the like, for the airplane.

The pressure control system 108, in one embodiment, uses one or more vents 106*a-n* to control the pressure within the vehicle 102. For example, the pressure control system 108 may regulate the pressurization rate of an airplane cabin based on the number and sizes of vents 106*a-n* located on the airplane. Certain conventional airplane pressure prevention systems, for example, only include an electronic pressure control system that monitors the door 104*a-n* indication and releases air through one or more air outlets 110*a-n* and/or reduces inflow into the vehicle, in the event the door 104 is indicated to be not closed, latched, or locked. Such a system, since it monitors only the door indication, may create a pressurization event based on false indications of a door 104*a-n* being not properly secured by being closed, latched, and locked. On the other hand, some conventional airplane pressurization systems, for example, only use mechanical vents 106*a-n* to control pressurization, and prevent over-pressurization, of the airplane cabin. However, the configuration of the vents 106*a-n*, such as the sizes of the vents 106*a-n*, the locations of the vents 106*a-n*, or the like, may be different for different types, sizes, and configurations of airplanes. For example, larger aircraft may require larger vents 106*a-n* than smaller aircraft.

It can be cumbersome and expensive to maintain different door 104*a-n*/vent 106*a-n* configurations for different types of vehicles 102. However, by adding a pressure control system 108 to a vehicle 102 that has existing vents 106*a-n*, maintaining different configurations of doors 104*a-n*/vents 106*a-n* for different vehicles 102, such as different airplanes, can be avoided because the pressure control system 108 can control the pressurization level and pressurization rate within the vehicle 102. The pressure control system 108 may include one or more modules, which are described in more detail with reference to FIG. 2, that perform the functions of the pressure control system 108.

Figure 2:
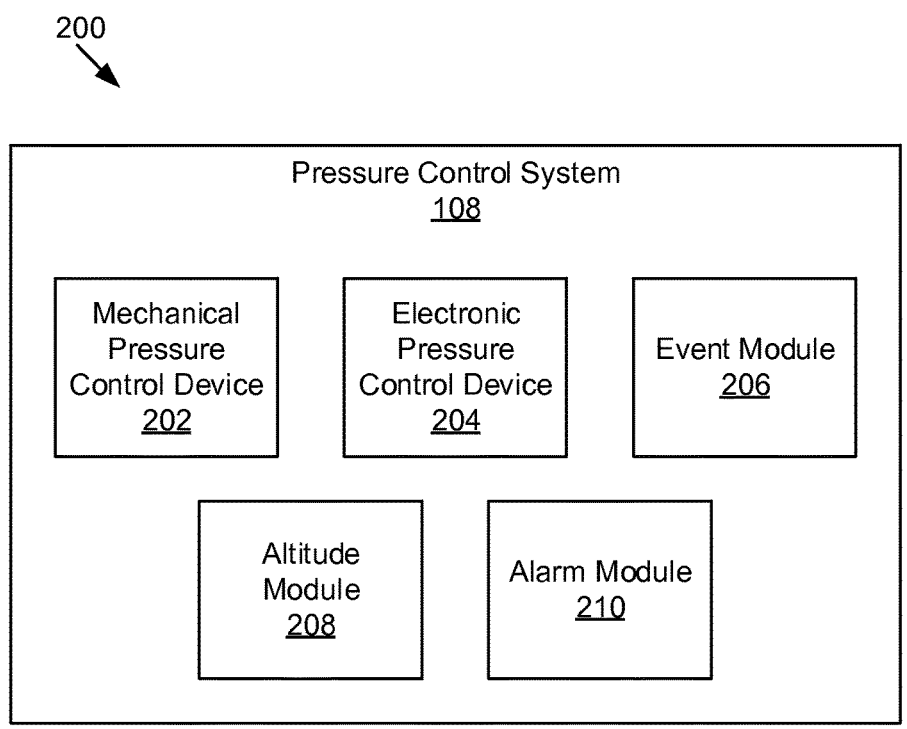
FIG. 2 is a schematic block diagram of a pressure control system of a hybrid mechanical/reactive pressure prevention system.

FIG. 2 illustrates one embodiment of a system 200 for a hybrid mechanical/reactive pressure prevention system. In one embodiment, the system 200 includes an embodiment of a pressure control system 108. The pressure control system 108 includes one or more of a mechanical pressure control device 202, an electronic pressure control device 204, an event module 206, an altitude module 208, and an alarm module 210, which are described in more detail below.

In one embodiment, the mechanical pressure control device 202 includes a physical, mechanical structure of the vehicle 102, such as the vents 106a-n described above with reference to FIG. 1. Other mechanical pressure control devices 202 can include different types of structures that allow air to flow out of and/or into a vehicle 102, such as the one or more air outlets 110a-n. In some embodiments, the mechanical pressure control device 202 is operably coupled to a door 104a-n, a window, or another structure capable of being opened and closed, and is accordingly a passive mechanical control device. For example, a vent 106a-n may be operably coupled to a door 104a-n of an airplane such that when the door 104a-n is secured, e.g., closed, latched, and locked, the vent 106a-n is also closed, and when the door 104a-n is unsecured, e.g., open, unlatched, or unlocked, the vent 106a-n is also open.

In one embodiment, the electronic pressure control device 204 is configured to control, manage, maintain, configure, monitor, or the like, the pressure within the vehicle 102. In order to control the pressure within the vehicle 102, in certain embodiments, the electronic pressure control device 204 increases and/or decreases a rate of pressurization within the vehicle 102. For example, the electronic pressure control device 204 may increase or decrease the rate at which air is pumped into the vehicle 102.

In certain embodiments, the electronic pressure control device 204 monitors a pressure level within the vehicle 102. In some embodiments, the electronic pressure control device 204 uses one or more pressure sensors, such as a barometer, to detect the pressure level inside and/or outside the vehicle 102. If the electronic pressure control device 204 determines that the pressure within the vehicle 102 is at an inappropriate, incorrect, unsafe, or the like level, the electronic pressure control device 204 adjusts the pressure level within the vehicle 102 by increasing or decreasing the pressurization rate. For example, if the electronic pressure control device 204 determines that the pressure level within an airplane is below a safe pressure level for the people travelling in the airplane based on the altitude of the airplane, the electronic pressure control device 204 may adjust the pressure level within the airplane by increasing the rate of air inflow into the airplane or decreasing the rate of air outflow out of the airplane, e.g. out of one or more air outlets 110a-n actively controlled by the electronic pressure control device 204.

In some embodiments, the electronic pressure control device 204 uses one or more mechanical pressure control devices 202 to control a pressure level within the vehicle 102. In one embodiment, the electronic pressure control device 204 determines how many mechanical pressure control devices 202 are on a vehicle 102, and the structural configurations of each mechanical pressure control device 202, to determine how much air can flow out of each mechanical pressure control device 202. The electronic pressure control device 204, in one embodiment, then determines how to adjust the rate that air flows into the vehicle 102 and the rate that air flows out of the vehicle 102.

For example, the electronic pressure control device 204 may determine how many actively controlled air outlets 110a-n are available on airplane and/or how many passively controlled vents 106a-n are open on the airplane, and the structural configuration of each air outlet 110a-n and/or open vent 106a-n, to determine how much air can be released through the available air outlets 110a-n and open vents 106a-n and, ultimately, how to adjust the rate of pressurization within the airplane either by adjusting the rate that air flows into the airplane and/or by adjusting the rate at which air flows out of the airplane by actively opening and closing the available air outlets 110a-n.

The event module 206, in one embodiment, is configured to detect a door event on the vehicle 102. The event module 206 can detect a door event by determining a door 104a-n on the vehicle 102 is not secured because the door 104a-n is not closed, latched, and/or locked, or is otherwise unsecured. In one embodiment, a door event indicates that a door 104a-n is not secure and air within the vehicle 102 is being released through a passive pressure control device operably coupled to the door 104a-n, such as a vent 106a-n.

In certain embodiments, the event module 206 receives a signal, notification, or the like from one or more sensors associated with a door 104a-n. For example, an airplane door 104a-n may include sensors that detect a door 104a-n is not fully closed, a door 104a-n is not latched, a door 104a-n is not locked, a vent 106a-n is open, or the like. As described above, if a door 104a-n is not fully secured by being closed, latched, and locked, the vent 106a-n mechanically coupled to the door 104a-n will also not be closed to allow air to flow out of the vehicle 102 and prevent the pressure in the vehicle 102 from exceeding a pressure at which if a door 104a-n that is not closed, latched, and locked were to open, it could result in an intense decompression of the vehicle 102 and cause further damage to the vehicle 102.

The event module 206, in one embodiment, is configured to detect a pressure event on the vehicle 102. The event module 206 can detect a pressure event by determining a pressurization level within the vehicle 102 is below or above a threshold pressurization level. In some embodiments, the threshold pressurization level is determined as a function of the size of the vehicle 102, the size of the cabin of the vehicle 102, the altitude of the vehicle 102, the number of passengers in the vehicle 102, and/or the like. For example, if the event module 206 determines that a door 104a-n is not secured, the threshold pressure level may be a pressure level, or range of pressures levels, where the pressure in the vehicle 102 could exceed a pressure at which if a door 104a-n that is not closed, latched, and locked were to open, it could result in an intense decompression of the vehicle 102 and cause further damage to the vehicle 102. Similarly, the event module 206 may also detect or determine that a pressure level within the vehicle 102 is reaching a cabin altitude warning pressure level. As used herein, the cabin altitude warning pressure level comprises an atmospheric pressure level of the vehicle 102 where it becomes unsafe for passengers and crew within the cabin of the vehicle 102.

In another embodiment, the event module 206 detects a pressure event by determining a rate of pressurization within the vehicle 102 is below or above a threshold pressurization rate. The event module 206 can determine that the pressurization rate is abnormal compared to a predetermined pressurization curve or function for the vehicle 102. For example, the event module 206 may determine that the pressurization rate for the cabin of an airplane should be 0.5-1.0 psi per unit time for every 5,000 feet of climbing elevation, according to a predetermined pressurization curve derived for the specifications of the airplane, such as the size of the airplane, the sizes and number of air outlets 110a-n, the altitude of the airplane, the climbing rate of the airplane, and/or the like. The event module 206, in one embodiment, detects a pressurization event in response to determining that the current pressurization rate is different than the pressurization rate calculated according to the predetermined pressurization curve.

The altitude module 208, in one embodiment, is configured to determine an altitude of the vehicle 102 in response to the event module 206 detecting a door event and/or a pressurization event. The altitude module 208 can use an altimeter, or the like, device to determine an altitude of the vehicle 102. In certain implementations, the altitude module 208 continuously monitors the altitude of the vehicle 102 while the vehicle 102 is travelling or is otherwise in motion and records, stores, saves, or the like, the altitude of the vehicle 102 when the event module 206 detects a door event and/or a pressurization event.

After the event module 206 detects either a door event or a pressurization event, the electronic pressure control device 204 reduces air inflow into the vehicle 102 and/or increases air outflow out of the vehicle 102 in response to the determined altitude of the vehicle 102 being below a threshold or cutoff altitude. The cutoff altitude is the altitude at which a pressurization event is ensured to not be related to a door 104a-n not being secured, and therefore a vent 106a-n being open. In other words, the cutoff altitude is the altitude at which if any door vent 106a-n was open, the cabin altitude warning would have sounded to indicate that the pressure within the vehicle 102 is at an unsafe pressure for the passengers and crew of the vehicle 102. In one embodiment, if the vehicle 102 surpasses the cutoff altitude, the hybrid system described herein can be suspended.

In some embodiments, the cutoff altitude is based on a number of characteristics of the vehicle 102, such as the size of the vehicle 102, the number of air outlets 110a-n on the vehicle 102, the size of the doors 104a-n on the vehicle 102, the number of open vents 106a-n on the vehicle 102, the volume of the cabin of the vehicle 102, the number of passengers in the vehicle 102, the rate of air inflow into the vehicle 102, the rate of air outflow into the vehicle 102, the current altitude of the vehicle 102, the pressure level within the vehicle 102, the rate at which the vehicle 102 is ascending, the structural strength of the vehicle to withstand a decompression, and so on.

In another embodiment, the electronic pressure control device 204 adjusts the air pressure within the vehicle 102 in response to the pressure level within the vehicle 102 being below a cabin altitude warning pressure level. The cabin altitude warning pressure level, as described above, may be a pressure level where the atmospheric pressure within the cabin of the vehicle 102 approaches an unsafe pressure level for the passengers of the vehicle 102. For example, the cabin altitude warning pressure level for an airplane may be equivalent to the atmospheric pressure at an elevation of 10,000 feet.

In another example, if the event module 206 detects a door event on an airplane while the airplane is climbing, meaning the door 104a-n is not secured and the vent 106a-n operably coupled to the door 104a-n is open, the electronic pressure control device 204 may reduce the air inflow into the airplane and/or increase the air outflow out of the airplane (e.g., out of one or more air outlets 110a-n) if the altitude of the vehicle 102 determined by the altitude module 208 is below the cutoff altitude. In this manner, the pressure control system 108 reduces the pressure within the cabin of the vehicle 102 to prevent the pressure in the vehicle 102 from exceeding a pressure at which if a door 104a-n that is not closed, latched, and locked were to open, it could result in an intense decompression of the vehicle 102 and cause further damage to the vehicle 102. However, as the pressure within the vehicle 102 is reduced, by either decreasing air inflow into the vehicle 102 or increasing air outflow out of the vehicle 102, the pressure within the cabin of the vehicle 102 can reach an unsafe level for the passengers of the vehicle 102, e.g., the cabin altitude warning pressure level.

Accordingly, in certain embodiments, described below with reference to the alarm module 210, an alarm will be activated if the pressure level within the vehicle 102 reaches the cabin altitude warning pressure level.

In certain embodiments, the electronic pressure control device 204, reduces air inflow into the vehicle 102 and/or increases air outflow out of the vehicle 102 until a pressure level within the vehicle 102 is reduced below a threshold pressure level. The threshold pressure level can be determined as a function of the pressure level within the vehicle 102 and the pressure level outside the vehicle 102 and is based on a number of characteristics of the vehicle 102, such as the size of the vehicle 102, the number of air outlets 110a-n on the vehicle 102, the size of the doors 104a-n on the vehicle 102, the number of open vents 106a-n on the vehicle 102, the volume of the cabin of the vehicle 102, the number of passengers in the vehicle 102, the rate of air inflow into the vehicle 102, the rate of air outflow into the vehicle 102, the current altitude of the vehicle 102, the pressure level within the vehicle 102, the rate at which the vehicle 102 is ascending, the structural strength of the vehicle to withstand a decompression, and so on.

For example, the threshold pressure level may be a pressure level where the difference between the pressure level within the vehicle 102 and the pressure level outside the vehicle 102 is substantially zero, within a predetermined range, or the like. In this manner, the electronic pressure control device 204 can depressurize the vehicle 102 to a safe level so that the pressure in the vehicle 102 does not exceed a pressure at which if a door 104a-n that is not closed, latched, and locked were to open, it could result in an intense decompression of the vehicle 102 and cause further damage to the vehicle 102.

In one embodiment, if the event module 206 detects a pressurization event after the cutoff altitude is reached without detecting a door event or a pressurization event prior to reaching the cutoff altitude, the electronic pressure control device 204 maintains or increases the rate of air inflow into the vehicle 102. For example, if an airplane reaches its cruising altitude (e.g., an altitude of 35,000 feet) without the event module 206 detecting a door event or a pressurization event prior to reaching the cutoff altitude, but then a pressurization event is detected by the event module 206 indicating that the vehicle 102 is losing pressure, the electronic pressure control device 204 will maintain or increase the rate of air inflow into the airplane to compensate for the loss of air pressure.

In certain embodiments, after the vehicle 102 has reached the cutoff altitude, the event module 206 and/or the electronic pressure control device 204 can ignore signals indicating a door event because it can be assumed that the doors 104a-n of the vehicle 102 have been properly secured if the vehicle 102 has surpassed the cutoff altitude without any decrease in the pressurization level and/or pressurization rate of the vehicle 102 while climbing to the cutoff altitude.

In one embodiment, if the event module 206 detects a door signal before the vehicle 102 reaches the cutoff altitude, but determines the pressurization rate of the vehicle 102 is normal, the event module 206 and/or the electronic pressure control device 204 can ignore the door signal, which is a false door signal, and continue to pressurize the vehicle 102 while it is climbing. On the other hand, in conventional pressure control systems, such a false signal forces the driver of the vehicle 102 to descend to a lower altitude. For example, a false door signal received on an airplane may force the pilot to unnecessarily descend or land the airplane, even if there is not a pressurization problem with the airplane. However, if such a signal is received by the hybrid system described herein, the pilot of the airplane can be assured that the doors 104a-n are properly secured as long as the airplane is pressurizing correctly, and can continue the airplane's climb.

The alarm module 210, in one embodiment, is configured to activate an alarm in response to determining the pressure within the vehicle 102 is below a safe pressure level for the passengers of the vehicle 102, e.g., the cabin altitude warning pressure level. As described above, the cabin altitude warning pressure level, in one embodiment, is an atmospheric pressure level within the vehicle 102 such that if the airplane continues to climb past the cutoff altitude, the pressure within the cabin of the airplane may reach an unsafe level for the passengers of the airplane. In one embodiment, the cabin altitude warning pressure level is an atmospheric pressure level that is equivalent to an elevation of 10,000 feet. In some embodiments, the alarm activated by the alarm module 210 is also known as the "Cabin Altitude Warning." The alarm module 210, in certain embodiments, activates the alarm to signal to the pilot, driver, etc., that the pressure within the vehicle 102 is at an unsafe level and that actions should be taken to resolve the pressure issue.

For example, as described above, in response to the event module 206 detecting a door event on an airplane before the airplane reaches the cutoff altitude, the electronic pressure control device 204 will reduce the air flow into the airplane and/or increase the air flow out of the airplane through one or more air outlets 110a-n to supplement the outflow through the mechanical door vent 106a-n. Accordingly, as the pressure within the airplane is reduced, the alarm module 210 determines that the pressure level is below a safe pressure level for the passengers of the airplane, e.g., a pressure level corresponding to the pressure level that will activate an alarm to alert the pilot(s) that the pressure level is becoming unsafe for the passengers, e.g., the pressure level is below the cabin altitude warning pressure level.

Conventional pressure control systems that only use a mechanical pressure control device 202, such as a door vent 106a-n, to bleed-off pressure may reach a particular altitude, 20-25,000 feet, for example, before the Cabin Altitude Warning alarm is activated. Unlike conventional pressure control systems that only include a mechanical pressure control device 202, the hybrid pressure control system disclosed herein accelerates activation of the Cabin Altitude Warning by the alarm module 210 because the electronic pressure control device 204 can react to the door event and increase the rate of air flow out of the vehicle 102 through the air outlets 110a-n, and/or decrease the rate of air flow into the vehicle 102, to cause the pressure within the vehicle 102 to decrease faster than if the vehicle 102 only used a door vent 106a-n for pressure control. Accordingly, the cabin pressure within the vehicle 102 will be at a lower level when the alarm module 210 triggers the Cabin Altitude Warning alarm than a vehicle 102 that only uses a mechanical pressure control device 202 to release air out of the vehicle 102.

Furthermore, if the alarm module 210 does not activate the Cabin Altitude Warning alarm before the cutoff altitude is reached, it can be safely determined that the doors 104a-n of the vehicle 102 are properly secured, e.g., closed, latched, and locked, and that any door event signal received or detected by the event module 206 can be safely ignored.

Figure 3:
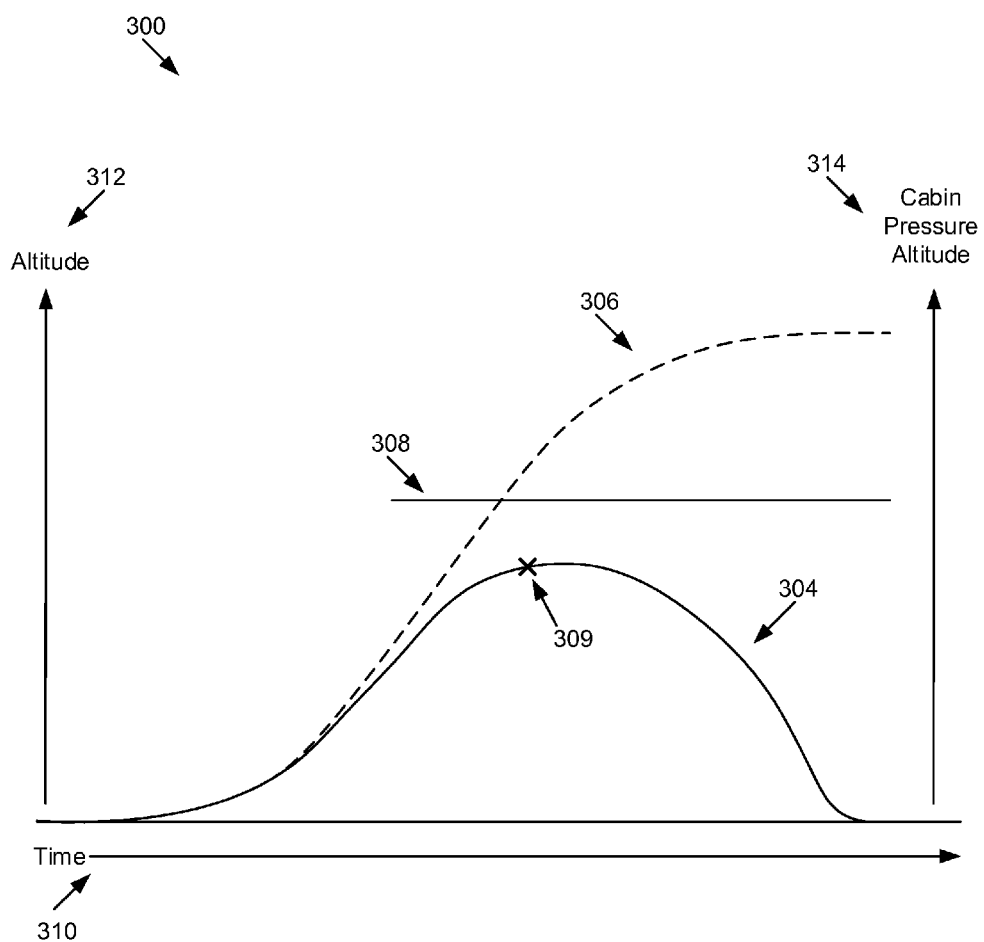
FIG. 3 is a schematic diagram illustrating a hybrid mechanical/reactive pressure prevention system for an aircraft.

FIG. 3 illustrates one example embodiment 300 of a hybrid mechanical/reactive pressure prevention system. In one embodiment, FIG. 3 illustrates a chart that includes time 310 along the x-axis, altitude 312 along the left-hand y-axis, and cabin pressure altitude 314 along the right-hand y-axis. As a vehicle 102, such as an airplane, initially begins its ascent, it gains altitude 312. In certain embodiments, the event module 206 detects one or more of a door event and a pressurization event in the vehicle 102. If the event module 206 detects a door event, meaning that a door 104a-n on the vehicle 102 is not secured and a vent 106a-n or other mechanical pressure control device 202 is open, the altitude module 208 determines an altitude of the vehicle 102 and compares that to a cutoff altitude 308 for the vehicle 102.

As described above, the cabin altitude warning pressure for the vehicle 102 is where the pressure within the cabin of the vehicle 102 approaches an unsafe pressure level for the passengers of the vehicle 102. For example, the cutoff altitude 308 may be an altitude of 20-25,000 feet; however, the cabin pressure altitude 314 may be an altitude where the pressure within the vehicle 102 is equivalent to the pressure at an elevation that would trigger the Cabin Altitude Warning alarm. In one embodiment, in response to the event module 202 detecting a door or pressure event and in response to the altitude module 204 determining that the altitude of the vehicle 102 is below the cutoff altitude 308, the electronic pressure control device 204 decreases air inflow into the vehicle 102 and/or increases air outflow out of the vehicle 102 (e.g., through one or more air outlets 110a-n) in order to decrease the pressure differential between the outside of the vehicle 102 and the inside of the vehicle 102. In this manner, the amount of pressure being applied against the unsecured door 104a-n can be reduced, which prevents the pressure in the vehicle 102 from exceeding a pressure at which if a door 104a-n that is not closed, latched, and locked were to open, it could result in an intense decompression of the vehicle 102 and cause further damage to the vehicle 102.

In certain embodiments, as the vehicle 102 approaches the cabin pressure warning altitude 309, due to the decrease in air inflow and/or the increase in air outflow, the alarm module 210 activates an alarm, e.g., the Cabin Altitude Warning alarm, to alert the pilot(s) or driver(s) that the pressure within the vehicle 102 is reaching an unsafe level. Accordingly, the vehicle 102 may be required to descend 304 to a lower altitude and a safer pressure level. For example, the cutoff altitude may be at an altitude of 16,000 feet; however, the alarm module may activate a Cabin Altitude Warning at an altitude of 12,000 feet for a door 104a-n that has a larger vent 106a-n, or 15,000 feet for a door 104a-n that has a smaller or more choked vent 106a-n, due to the cabin pressure within the vehicle 102 being at an unsafe level for the passengers and crew.

In another embodiment, if the alarm module 210 does not activate an alarm indicating that the pressure level within the vehicle 102 is at or approaching an unsafe pressure level before reaching the cutoff altitude 308, meaning that the event module 206 did not detect a door event or a pressurization event that caused a decrease in air inflow and/or an increase in air outflow, the vehicle 102 will continue along a normal course 306 until it reaches a cruising altitude. If the event module 206 detects a door event during the climb before the cutoff altitude 308 is reached, and the vehicle 102 is pressurizing normally, the event module 202 and/or the electronic pressure control device 204 can ignore the door event because the doors 104a-n are secured and the received door event signal is a false signal. In other words, because the vehicle 102 is pressurizing correctly, it can be determined that no vents 106a-n are open, and consequently, no doors 104a-n are unsecured. In such a situation, a door event is considered a false signal and can be ignored so that the vehicle 102 can continue its normal ascent without unnecessarily descending to a lower altitude. Furthermore, if the event module 206 detects a pressurization event after the vehicle 102 reaches the cutoff altitude 308, the electronic pressure control device 204 will maintain or increase the rate of air inflow into the vehicle 102 to compensate for any pressure loss.

Figure 4A:
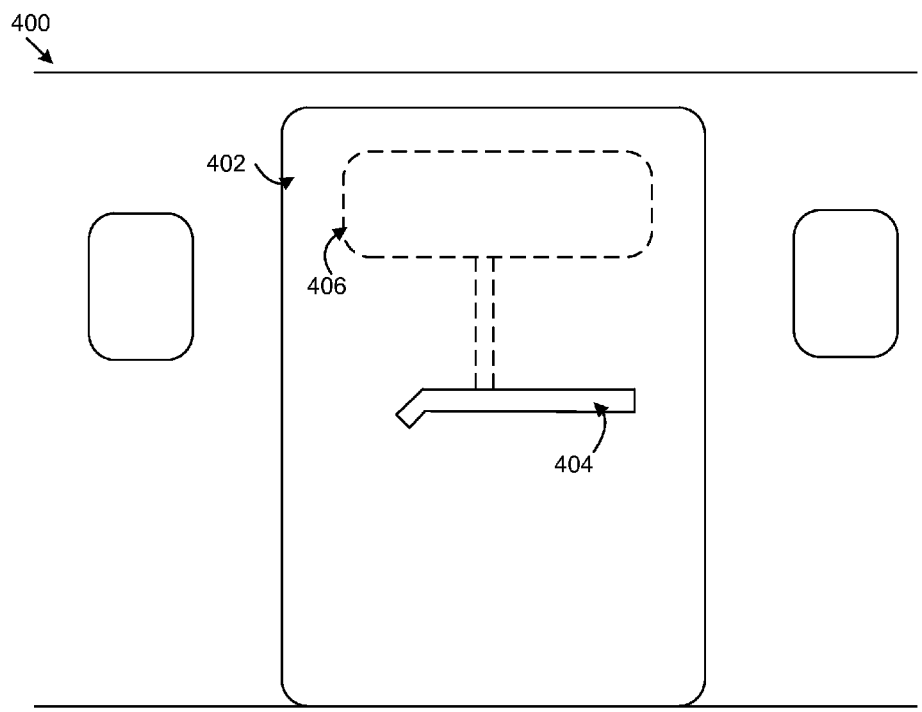
FIG. 4A is a schematic diagram illustrating one embodiment of a door and mechanical vent assembly of an aircraft.
Figure 4B:
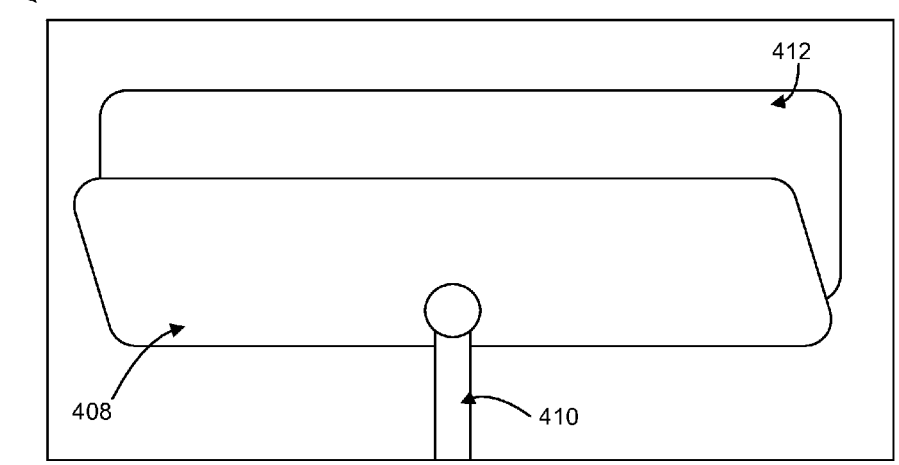
FIG. 4B is a schematic diagram illustrating one embodiment of a mechanical vent assembly of an aircraft.

FIG. 4A and FIG. 4B depicts an embodiment of a mechanical/passive pressure control device 202 of a vehicle 102. The depicted embodiment 400 of FIG. 4A is one example of a door 104a-n and a passive vent 106a-n assembly. In one embodiment, the door 402, such as an airplane door, includes a lever 404 that is actuated to open and close the door 402. When the door 402 is secured, e.g., when the door 402 is closed, latched, and locked, air within the vehicle 102 cannot be released through the door 402, which allows the air flowing into the vehicle 102 to pressurize the vehicle 102. In one embodiment, a vent 406 is operably coupled to the door 402 by the lever 404 such that when the lever 404 is actuated to open and close the door 402, the vent 406 is also opened and closed. Thus, the vent 406 will be open if the door 402 is not fully secured, e.g., is not closed, latched, or locked. In this manner, air within the vehicle 102 can be released out of the vent 406 to prevent the pressure in the vehicle 102 from exceeding a pressure at which if a door 104a-n that is not closed, latched, and locked were to open, it could result in an intense decompression of the vehicle 102 and cause further damage to the vehicle 102

FIG. 4B depicts one embodiment of a vent assembly 406. The vent assembly 406 includes a vent panel 408, a linking assembly 410, and a vent opening 412. In one embodiment, when the door 402 is secured using the lever 404, the vent panel 408 will also be secured by the linking assembly 410 operably coupled to the lever 404 to prevent air from being released through the vent opening 412. On the other hand, when the door 402 is not closed, latched, or locked, the vent panel 408 will be open to allow air inside the vehicle 102 to be released through the vent opening 412, which reduces the pressure within the vehicle 102 and helps prevent the pressure in the vehicle 102 from exceeding a pressure at which if a door 104a-n that is not closed, latched, and locked were to open, it could result in an intense decompression of the vehicle 102 and cause further damage to the vehicle 102.

Figure 5:
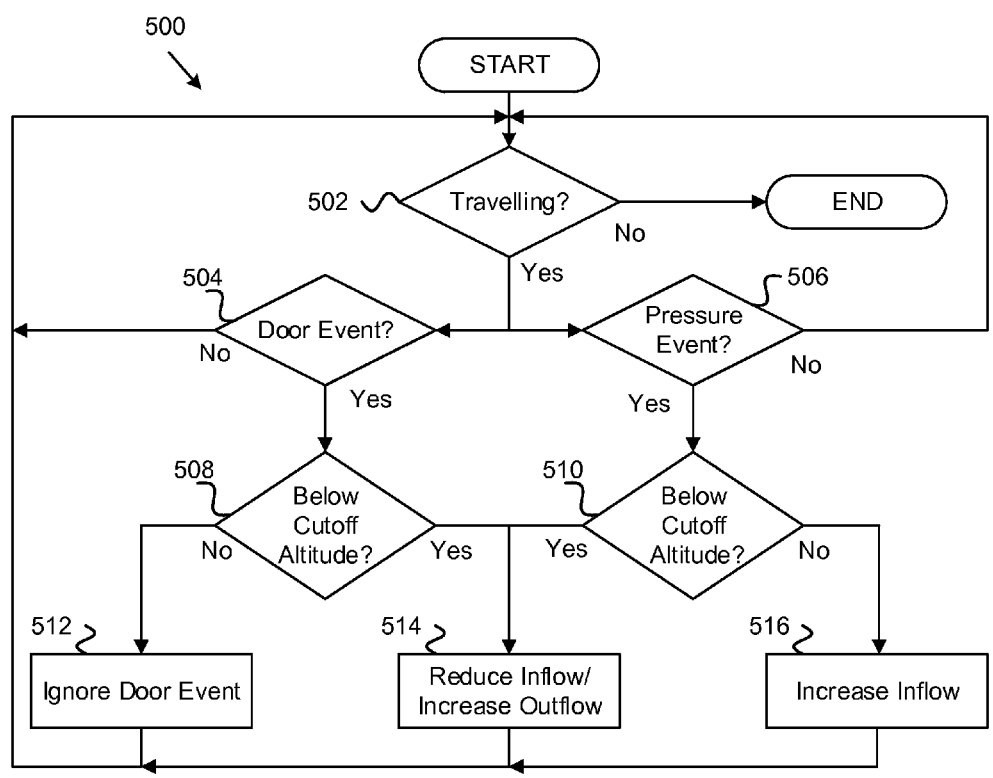
FIG. 5 is a schematic flow diagram of one embodiment of a method of preventing pressurization within an aircraft using a hybrid mechanical/reactive pressure prevention system.

FIG. 5 is a schematic flow chart diagram illustrating one embodiment of a method 500 of controlling the pressure within a vehicle 102 using a hybrid mechanical/reactive pressure prevention system. In one embodiment, the method 500 begins and determines 502 whether the vehicle 102 is travelling, ascending, climbing, or is otherwise in motion. If the method 500 determines 502 that the vehicle 102 is travelling, in one embodiment, the method 500 detects 504 a door event and/or detects 506 a pressure event. In certain embodiments, if the method 500 detects 504 a door event, which indicates that a door 104a-n is not secure and air within the vehicle 102 is being released through a passive pressure control device operably coupled to the door 104a-n, such as a vent 106a-n, the method 500 determines 508 an altitude of the vehicle 102. In various embodiments, if the method 500 determines 508 that the altitude of the vehicle 102 is below a cutoff altitude, the method 500 reduces 514 air inflow into the vehicle 102 and/or increases 514 air outflow out of the vehicle 102 using an active pressure control device, such as the air outlets 110a-n. If the method 500 determines 508 that the vehicle 102 is above the cutoff altitude, in another embodiment, the method 500 ignores 512 the door event.

If the method 500, in one embodiment, detects 506 a pressure event, the method 500 determines 510 whether the altitude of the vehicle 102 is above or below a cutoff altitude. In certain embodiments, if the method 500 determines 510 that the altitude of the vehicle 102 is below a cutoff altitude, the method 500 reduces 514 air inflow into the vehicle 102 and/or increases 514 air outflow out of the vehicle 102 using an active pressure control device, such as the air outlets 110a-n. In another embodiment, if the method 500 determines 510 that the altitude of the vehicle 102 is above a cutoff altitude, the method 500 increases 516 air inflow into the vehicle 102 to compensate for a pressure loss within the vehicle 102. The method 500, in some embodiments, continues to monitor for door and/or pressure events while the vehicle 102 is travelling 502, and the method 500 ends. In some embodiments, the method 500 utilizes a passive pressure control device 202, an electronic pressure control device 204, an event module 206, and an altitude module 208, as described above, to perform the various steps of the method 500.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables, and/or non-executables, of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present disclosure may be written in any combination of one or more programming languages, including, but not limited to, an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In one implementation, the computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method comprising:
   detecting, by an event module, a pressure event in a pressurized vehicle;
   determining, by an altitude module, an altitude of the pressurized vehicle in response to detecting the pressure event;
   determining, by an active pressure control device, that the detected pressure event is an actual door event in response to the determined altitude of the pressurized vehicle being below a cutoff altitude, the actual door event indicating that a door is not secure and air within the pressurized vehicle is being released through a passive pressure control device operably coupled to the door; and
   one or more of reducing air inflow into the pressurized vehicle and increasing air outflow out of the pressurized vehicle, by the active pressure control device, in response to determining the actual door event.

2. The method of claim 1, further comprising one of maintaining a rate of air inflow into the pressurized vehicle and increasing the rate of air inflow into the pressurized vehicle in response to detecting a pressurization event and determining the altitude of the pressurized vehicle is above the cutoff altitude.

3. The method of claim 1, wherein the passive pressure control device comprises a mechanical vent that is operably coupled to a door of the pressurized vehicle such that the vent is opened to allow air within the pressurized vehicle to flow out of the pressurized vehicle in response to the door being unsecured and closed to prevent air outflow out of the pressurized vehicle in response to the door being secured.

4. The method of claim 1, wherein one or more of air inflow into the pressurized vehicle is reduced and air outflow out of the pressurized vehicle is increased until a pressure level within the pressurized vehicle meets a threshold pressure level.

5. The method of claim 4, wherein the threshold pressure level is determined as a function of the pressure level within the pressurized vehicle and a pressure level outside the pressurized vehicle.

6. The method of claim 4, further comprising activating an alarm in response to one or more of the reduction in air inflow into the pressurized vehicle and the increase in air outflow out of the pressurized vehicle causing a pressure within the pressurized vehicle to be below a safe pressure level.

7. The method of claim 6, wherein the alarm remains activated until the pressure level within the pressurized vehicle is at a safe pressure level.

8. The method of claim 1, wherein the cutoff altitude is determined as a function of one or more of a size of one or more air vents of the pressurized vehicle, a rate of air inflow into the pressurized vehicle, a rate of air outflow out of the pressurized vehicle, a volume of a cabin of the pressurized vehicle, a rate at which the pressurized vehicle is ascending, and the structural capability of the vehicle.

9. The method of claim 1, wherein the actual door event comprises a door is one or more of open, unlatched, and unlocked.

10. The method of claim 1, further comprising detecting a pressurization event, wherein detecting the pressurization event comprises determining one or more of a pressurization level within the pressurized vehicle is below a threshold pressurization level and a rate of pressurization within the pressurized vehicle is below a threshold pressurization rate.

11. The method of claim 1, further comprising determining that the detected pressure event is a false signal in response to the pressurized vehicle reaching the cutoff altitude.

12. An apparatus comprising:
a passive pressure control device operably coupled to a door that allows air within a pressurized vehicle to flow out of the pressurized vehicle;
an event module that detects a pressure event in the pressurized vehicle;
an altitude module that determines an altitude of the pressurized vehicle in response to detecting the pressure event; and
an electronic pressure control device that:
determines that the detected pressure event is an actual door event in response to the determined altitude of the pressurized vehicle being below a cutoff altitude, the actual door event indicating that a door is not secure and air within the pressurized vehicle is being released through a passive pressure control device operably coupled to the door, and
one or more of reduces air inflow into the pressurized vehicle and increases air outflow out of an active pressure control device of the pressurized vehicle in response to determining the actual door event.

13. The apparatus of claim 12, wherein the electronic pressure control device one of maintains a rate of air inflow into the pressurized vehicle and increases the rate of air inflow into the pressurized vehicle in response to the event module detecting a pressurization event and the altitude module determining the altitude of the pressurized vehicle is above the cutoff altitude.

14. The apparatus of claim 12, wherein the passive pressure control device comprises a mechanical vent that is operably coupled to a door of the pressurized vehicle such that the vent is opened to allow air within the pressurized vehicle to flow out of the pressurized vehicle in response to the door being unsecured and closed to prevent air outflow out of the pressurized vehicle in response to the door being secured.

15. The apparatus of claim 12, wherein the electronic pressure control device one or more of reduces air inflow into the pressurized vehicle and increases air outflow out of the pressurized vehicle until a pressure level within the pressurized vehicle meets a threshold pressure level.

16. The apparatus of claim 15, wherein the threshold pressure level is determined as a function of the pressure level within the pressurized vehicle and a pressure level outside the pressurized vehicle.

17. The apparatus of claim 15, further comprising an alarm module that activates an alarm in response to one or more of the reduction in air inflow into the pressurized vehicle and the increase in air outflow out of the pressurized vehicle causing a pressure within the pressurized vehicle to be below a safe pressure level.

18. The apparatus of claim 17, wherein the alarm remains activated until the pressure level within the pressurized vehicle is at a safe pressure level.

19. A vehicle comprising:
at least one passive vent operably coupled to a door of the vehicle, wherein the vent opens to allow air within the vehicle to flow out of the vehicle in response to the door being unsecured and closes to prevent air outflow out of the vehicle in response to the door being secured;
a pressure control system that pressurizes the vehicle, the pressure control system configured to:
detect a pressure event in the vehicle;
determine an altitude of the vehicle in response to detecting the pressure event;
determine that the detected pressure event is an actual door event in response to the determined altitude of the vehicle being below a cutoff altitude; and
one or more of reduce air inflow into the vehicle and increase air outflow out of an active pressure control device of the vehicle in response to determining the actual door event, wherein at least a portion of the outflowing air exits through the at least one vent.

20. The vehicle of claim 19, wherein the pressure control system is further configured to one of maintain a rate of air inflow into the vehicle and increase a rate of air inflow into the vehicle in response to detecting a pressurization event and determining the altitude of the vehicle is above the cutoff altitude.

* * * * *